UNITED STATES PATENT OFFICE.

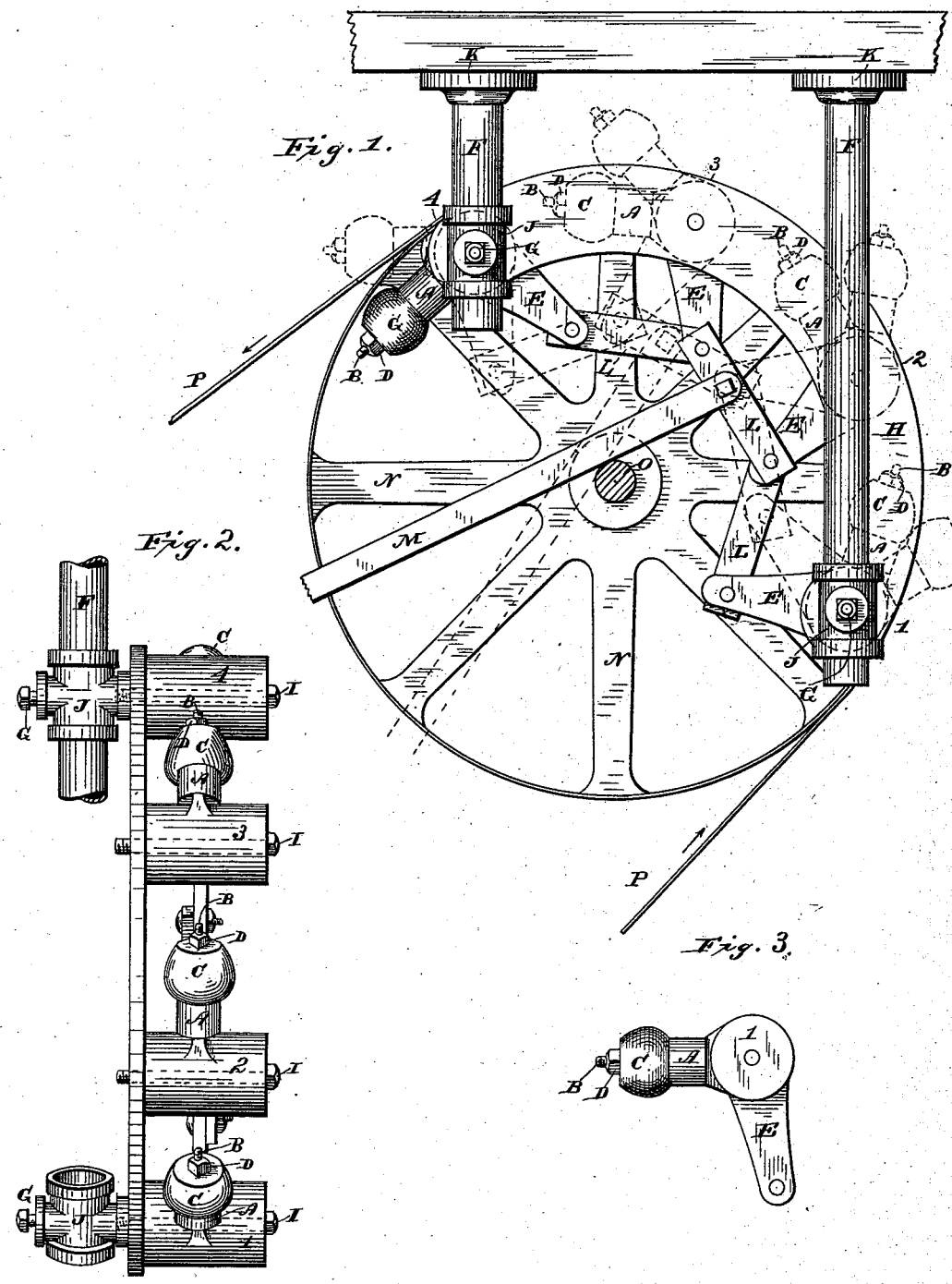

UNICO H. W. SCHENCK, OF BROOKLYN, ASSIGNOR OF FOUR-TENTHS TO CHARLES A. WILLIS, OF NEW YORK, N. Y.

BELT-SHIFTER.

SPECIFICATION forming part of Letters Patent No. 379,988, dated March 27, 1888.

Application filed March 18, 1887. Serial No. 231,448. (No model.)

*To all whom it may concern:*

Be it known that I, UNICO H. W. SCHENCK, a citizen of the United States, residing at New York, in the county of New York and State of New York, have invented certain new and useful Improvements in Belt-Shifters; and I do hereby declare the following to be a full, clear, and exact description of the invention, such as will enable others skilled in the art to which it appertains to make and use the same.

My invention consists of a series of belt-supports secured to a supporting-plate and arranged in a segmental line thereon concentric with and in close proximity to an associated pulley. These supports form the carrier for the belt when it is not in operation. In connection with the supports I arrange a series of movable arms corresponding in number to the number of supports, one of said arms being located in front of each support. These arms are provided on their outer ends with rollers capable of rotation toward the pulley. An operating-lever is connected by suitable intermediate mechanism with the arms, whereby they can be moved so as to bring the rollers on their outer ends either within or without the segmental line in which the supports are arranged. When the belt is not in operation, it is held upon the supports. The arms carrying the rollers are so arranged that when they are moved so as to bring the rollers beyond the supports said rollers will engage with the under side of the belt at points beyond its running center line away from the pulley, and will lift said belt from the supports and cause it to incline downward toward the pulley. The tension and weight of the belt coming upon the upper surfaces of the rollers approximate to the pulley cause said rollers to revolve toward the pulley, and thus shift the belt onto the same.

The particular construction and arrangement of the various parts of the preferred form of my said invention I will now proceed to point out and describe, reference being had to the accompanying drawings, in which—

Figure 1 represents a side elevation of my improved belt-shifter and a working-pulley associated therewith, dotted line showing the movement of the belt-shifting device when applied. Fig. 2 is a face view of the belt-shifter, and Fig. 3 a detail.

Referring to said drawings, K K represent flanges secured to a suitable support. Two pieces of tubing, F F, are secured to and depend from the flanges K K. Mounted on said tubing are couplings J J, provided with set-screws G G. Secured to the couplings is a sector-shaped plate, H, forming a support for the belt-shifting device hereinafter described. O represents a shaft passing under the plate H; N, a driving-pulley mounted thereon, and P the belt.

1 2 3 4 represent a series of belt-supports mounted upon bolts I I I I, secured to and projecting at right angles from the supporting-plate on its side approximate to the associated pulley. The end bolts I I pass through the plate and screw into the couplings J J, thus securing the plate to said couplings.

The belt-supports are preferably cylindrical in form, and are arranged in a segmental line on the plate concentric with the associated pulley and in close proximity thereto, the outer surfaces of the cylindrical supports being about flush with the face of the driving-pulley. The first of the supports, 1, is placed in a line with the belt-receiving point of the pulley, the last support, 4, in line with the point where the belt leaves the pulley. The supports described form the belt-carrier. The belt is shifted from the pulley onto said supports by hand or by any approved shifting device, which is not shown in the drawings, as it forms no part of my invention, the return of the belt to the pulley being dependent upon the action of the shifting device, which I will now describe.

Projecting from and in front of each cylindrical support are arms B, having shoulders A. On the outer ends of said arms are mounted rollers or sheaves C, held in place by nuts D. The first of the series of rollers or sheaves come between supports 1 and 2, the second between supports 2 and 3, &c., the last roller having no belt-support beyond it. Said rollers or sheaves C are capable of rotation toward the pulley. The arms B are so secured to the supports that when said arms are raised the rollers or sheaves on the same will engage with the under side of the belt at points beyond its running center line away from the pulley. I preferably accomplish this by securing said arms to the supports on one side of their longitudinal centers away from the pulley. Said arms may, however, be bent so as to accomplish the same result.

E represents lever-arms projecting from the supports at about right angles to the arms B. The ends of said lever-arms are connected at equal distances apart by links L L L. To the center link is secured an operating hand-lever, M, having its fulcrum on the running shaft O, the free end of the lever being within reach of the operator.

It will be noticed that the cylindrical supports do not revolve; but my shifting device could be used with revolving supports.

By means of the adjustable couplings J J the supporting-plate may be adjusted to or from the shaft carrying the pulley. When the belt is not in operation, it rests upon the supports forming the carrier, having been shifted onto the same by an approved shifting device. The rollers or sheaves are then within the segmental line in which the supports are arranged, and do not touch the belt. When it is desired to shift the belt from the carrier onto the pulley, the operation of my shifting device is as follows: The operator draws the free end of the hand-lever M down, and through the intermediate mechanism described turns the cylindrical supports until the arms B are moved so as to bring the rollers or sheaves on their outer ends in contact with the under side of the belt at points beyond its running center line away from the pulley. Continuing to move the lever M down, the rollers are moved without the segmental line in which the supports are arranged, thus lifting the belt from said supports and causing it to incline downward toward the pulley. The greater weight and tension of the belt coming upon the inner upper surfaces of the rollers approximate to the pulley causes said rollers or sheaves to revolve toward the pulley, and thus shift the belt onto the same.

The motion of the shaft against the hand-lever materially lessens the force required to be applied to the lever to raise the rollers or sheaves, thus greatly assisting the operator in making a shift. With my belt-shifting device heavy and tight belts can readily and easily be shifted onto a working-pulley.

It is evident that various changes may be made in the construction and arrangement of the various parts described without departing from the spirit and scope of my invention, and I do not wish to limit myself strictly to the construction herein set forth; but,

Having thus fully described my invention, what I claim as new, and desire to secure by Letters Patent, is—

1. In a belt-shifter, a sustaining-frame and a series of belt-supports arranged in a segmental line thereon in close proximity to an associated pulley, in combination with a series of movable arms mounted on the frame within the segmental line in which the supports are arranged, and connected with a suitable operating-lever, and having rollers on their outer ends capable of rotation toward the pulley and adapted to engage with the under side of a belt on the supports, lift the same, and shift it onto the pulley when the outer ends of the arms are moved beyond said supports, all constructed, arranged, and operating substantially as shown and described.

2. In a belt-shifter, a sustaining-frame and a series of belt-supports arranged in a segmental line thereon in close proximity to an associated pulley, in combination with a series of movable arms mounted on the frame within the segmental line in which the supports are arranged, and connected with a suitable operating-lever, and having rollers on their outer ends capable of rotation toward the pulley and so arranged that when the outer ends of the arms are moved beyond the supports the rollers will engage with the under side of a belt on the same at points beyond its running center line away from the pulley, all constructed, arranged, and operating substantially as shown and described, as and for the purpose specified.

3. In a belt-shifter, the combination of a suitable sustaining-plate, a series of laterally-projecting belt-supports mounted on bolts secured to said plate and arranged in a segmental line thereon in close proximity to an associated pulley, said belt-supports having shifting arms projecting at an angle therefrom and provided with rollers on their outer ends, and lever-arms connected with a suitable operating-lever, all constructed, arranged, and operating substantially as shown and described, whereby when the belt-supports are turned the rollers on the shifting arms will engage with the under side of the belt on said supports, lift the same, and shift it onto the pulley.

4. In a belt-shifter, the combination of the supporting-plate H, belt-supports 1 2 3 4, arranged in a segmental line thereon, and having lever-arms E connected with a suitable operating-lever, and projecting arms B, having rollers on their outer ends, said arms being so arranged that when their outer ends are moved beyond the supports the rollers will engage with the under side of the belt at points beyond its running center line away from the pulley, all constructed, arranged, and operating substantially as shown and described.

5. In a belt-shifter, the combination of the supporting-plate H, belt-supports 1 2 3 4, mounted on said plate and having projecting arms B, provided with rollers or sheaves C on their outer ends, and the lever-arms E, links L L L, and operating-lever M, and the shaft O, forming a fulcrum for the lever M, all constructed, arranged, and operating substantially as shown and described, as and for the purpose specified.

UNICO H. W. SCHENCK.

Witnesses:
    JOS. STRUTHERS,
    R. D. SERVOSS.